(12) United States Patent
Hartnett et al.

(10) Patent No.: US 7,058,793 B1
(45) Date of Patent: Jun. 6, 2006

(54) PIPELINE CONTROLLER FOR PROVIDING INDEPENDENT EXECUTION BETWEEN THE PRELIMINARY AND ADVANCED STAGES OF A SYNCHRONOUS PIPELINE

(75) Inventors: Thomas D. Hartnett, Roseville, MN (US); John S. Kuslak, Blaine, MN (US); Gary J. Lucas, Pine Springs, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/468,051

(22) Filed: Dec. 20, 1999

(51) Int. Cl.
*G06F 9/40* (2006.01)
(52) U.S. Cl. .................................... 712/219
(58) Field of Classification Search ................ 712/212, 712/205, 206, 207, 219
See application file for complete search history.

(56) References Cited

U.S. PATENT DOCUMENTS

| | | | | |
|---|---|---|---|---|
| 5,325,495 | A * | 6/1994 | McLellan | 712/219 |
| 5,490,255 | A * | 2/1996 | Rawlinson et al. | 712/219 |
| 5,577,259 | A * | 11/1996 | Alferness et al. | 712/200 |
| 5,778,423 | A * | 7/1998 | Sites et al. | 711/113 |
| 6,026,477 | A * | 2/2000 | Kyker et al. | 712/2 |
| 6,112,295 | A * | 8/2000 | Bhamidipati et al. | 711/110 |
| 6,157,988 | A * | 12/2000 | Dowling | 711/125 |
| 6,351,803 | B1* | 2/2002 | Peng et al. | 712/216 |

OTHER PUBLICATIONS

Hayes, John P.; "Computer Architecture and Organization: Second Edition"; McGraw-Hill Series in Computer Organization and Architecture; 1988; pp. 377 and 592.*

Hayes, JohnP., "Computer Architecture and Organization", McGraw-Hill Book Company, 1978, pp. 223-224.*
Smith et al., "The Microarchitecture of Superscalar Processors", Proceedings of The IEEE, vol. 83 No. 12, Dec. 1995, pp. 1609-1624.*

\* cited by examiner

*Primary Examiner*—Kakali Chaki
*Assistant Examiner*—William H. Wood
(74) *Attorney, Agent, or Firm*—Beth L. McMahon; Charles A. Johnson; Mark T. Starr

(57) ABSTRACT

A synchronous pipeline design is provided that includes a first predetermined number of fetch logic sections, or "stages", and a second predetermined number of execution stages. Instructions are retrieved from memory and undergo instruction pre-decode and decode operations during the fetch stages of the pipeline. Thereafter, decoded instruction signals are passed to the execution stages of the pipeline, where the signals are dispatched to other execution logic sections to control operand address generation, operand retrieval, any arithmetic processing, and the storing of any generated results. Instructions advance within the various pipeline fetch stages in a manner that may be independent from the way instructions advance within the execution stages. Thus, in certain instances, instruction execution may stall such that the execution stages of the pipeline are not receiving additional instructions to process. This may occur, for example, because an operand required for instruction execution is unavailable. It may also occur for certain instructions that require additional processing cycles. Even though instructions are not entering the execution stages, instructions may continue to enter the fetch stages of the pipeline until all fetch stages are processing a respective instruction. As a result, when normal instruction execution resumes within the execution stages of the pipeline, all fetch stages of the pipeline have been filled, and pre-decode and decode operations have been completed for those instructions awaiting the entry into the execution stages of the pipeline.

33 Claims, 13 Drawing Sheets

PIPELINE CONTROLLER FOR PROVIDING INDEPENDENT EXECUTION BETWEEN THE PRELIMINARY AND ADVANCED STAGES OF A SYNCHRONOUS PIPELINE

FIELD OF THE INVENTION

This invention relates to a system and method for controlling the flow of instructions through a synchronous instruction pipeline within an instruction processor; and, more particularly, to a system that allows instruction processing to continue within first predetermined stages of the synchronous instruction pipeline independently of instruction execution occurring within second predetermined stages of the pipeline.

DESCRIPTION OF THE PRIOR ART

Many of today's high-speed digital instruction processors utilize a pipelined architecture. In pipelined architectures, several instructions are being executed within the Instruction Processor (IP) logic at the same time. An instruction is partially executed by a first section of the IP logic, is then passed to another section of the IP logic to undergo a second phase of processing, and so on. In an exemplary IP pipeline, a first section of the IP may be executing the hardware sequences associated with an instruction N. At the same time, a second logic section may be fetching an operand in preparation for execution of the next instruction N+1. Yet a third logic section may be performing the initial decode for the following instruction N+2. This use of an "instruction pipeline" is analogous to the use of an assembly line in the manufacture of goods, wherein various stations on the assembly line each performs a specific manufacturing function on a respective item of manufacture, and all stations may operate in parallel. In the same way that an assembly lines increases manufacturing efficiency, the parallelism associated with the various logic sections in an instruction pipeline increases the throughput of a digital data processing system.

Instruction pipelines can be implemented using either synchronous or asynchronous designs. In synchronous designs, data moves from one logic section to the next in lock step and at predetermined time increments as controlled by the data processor clock. As a result, the clock must be tuned to operate only as fast as the execution of the slowest stage of any instruction within the instruction set of the processor. This may diminish processor throughput, particularly in those systems having a complex and diverse instruction set architecture. In contrast, asynchronous designs control the movement of data through the pipeline via local control mechanisms. These mechanisms allow data to be transferred between logic sections in the pipeline when processing has been completed by a logic section and another (subsequent) pipeline logic section is ready to receive the processing result. Thus data passes through an asynchronous pipeline at varying time intervals based on the particulars associated with a given instruction.

According to a simple asynchronous pipeline design, each stage of the pipeline is connected serially via First-In, First Out storage devices (FIFOs). The result of one pipeline stage is temporarily stored in a FIFO until the next stage is ready to receive that data for additional processing. This allows each of the stages to execute independently with respect to timing. This type of pipeline is relatively simple to design, but is generally logic intensive. Moreover, the time required to store and retrieve processing results from the FIFO can slow pipeline execution.

A variation of the above-described asynchronous pipeline design reduces each FIFO to a single register. In this design, each stage of the pipeline is associated with a stage controller that controls the movement of data between the stages. The data transfer is coordinated by a pair of handshake signals between stage controllers of adjacent stages. Although fewer storage locations are needed to implement this design, the control logic is more complex. Additionally, the time required to execute the handshaking mechanism slows throughput.

U.S. Pat. No. 5,920,899 to Chu discloses a system that seeks to improve throughput of an asynchronous pipeline using a handshake mechanism that is initiated between two stages slightly before data is actually available at the output of a stage. Thus, a portion of the overhead required to perform the handshake protocol is "buried" by processing time. To accomplish this, a timing delay is inserted in the control path of each pipeline stage that is equivalent to the worst case propagation delay of the functional logic of that stage. The resulting system is relatively logic intensive.

U.S. Pat. No. 5,732,233 to Klim, et al. discloses yet another system for improving the performance of an asynchronous pipeline. The Klim system utilizes control elements that each have a reduced number of logic states and thus are able to perform the handshaking function more efficiently. Never-the-less, some overhead is imposed by the data flow control between the pipeline stages.

As discussed above, synchronous designs are less complex, and eliminate the requirement to control data flow between pipeline stages. Moreover, in systems having an instruction set in which most instructions can be executed in stages that each requires roughly the same amount of processing time, a synchronous pipeline can generally execute faster than asynchronous designs. A synchronous pipeline design of this nature is described in U.S. Pat. No. 5,577,259 to Alfemess et al. assigned to the assignee of the current invention. In this system, the clock rate is adjusted so that the pipeline operates at a speed that will accommodate processing of a majority of "standard" instructions within the instruction set. For other "non-standard" instructions, additional instruction processing is provided by inserting "extended" stages into the pipeline. These extended stages are not controlled by the pipeline hardware, but instead are controlled by a microsequencer that executes micro instructions stored in an embedded memory device within the processor. By utilizing microcode control to insert additional cycles during the execution of only a limited number of non-standard instructions, pipeline throughput is optimized.

Another method of optimizing synchronous pipeline execution is described by U.S. Pat. No. 5,911,083 to Kuslak which is assigned to the assignee of the current invention. The disclosed system allows a predetermined selectable number of clock cycles to be inserted during the pipeline execution of any selectable one or more of the instructions in the instruction set. During the additional clock cycles, predetermined ones of the logic sections within the pipeline are not allowed to provide data to the next logic section in the pipeline. This provides additional processing time for those instructions that are associated with non-standard timing requirements. Thus, the synchronous pipeline may be tuned to accommodate the majority of instructions in the instruction set, with pipeline execution being extended only where necessary.

The above-described synchronous pipeline designs provide optimal pipeline execution in most situations. However, because each of the synchronized stages operates in a lock-step fashion, inefficiency still exists in those situations in which the pipeline is partially emptied. This may occur, for example, when a cache miss situation occurs. As is known in the art, instructions generally enter a pipeline from a relatively fast and accessible cache memory. If an addressed instruction is not available within the cache, however, the instruction must be retrieved from a slower memory. As a result, the instruction can not be provided to the pipeline in the time required to keep the pipeline filled. One or more clock cycles may pass before the instruction is available from this slower memory, and one or more of the first stages of the pipeline are therefore emptied. The instructions that entered the pipeline prior to the cache miss situation continue to advance through the pipeline, completing execution as would otherwise occur.

Assume that in the foregoing cache-miss scenario, the pipeline is one of the synchronous types discussed above for inserting additional clock cycles into the pipeline. Further assume that one of the instructions still resident in the pipeline when the cache miss occurs is a non-standard instruction that will be associated with these additional clock cycles. During these additional inserted clock cycles, the non-standard instruction does not advance through the pipeline in a typical fashion. Instead, normal pipeline execution is halted until the additional processing is completed. Because the pipeline operates in lock-step, all instructions that enter the pipeline after that non-standard instruction enters the pipeline also remain in the same pipeline stage until normal execution resumes. If these initial pipeline stages do not contain instructions because of a cache miss situation, these pipeline stages remain empty until normal execution resumes and the stages can be filled with available instructions. This is true even if an instruction from memory becomes available during the additional inserted clock cycles. As a result, several clock cycles are wasted to fill the pipeline.

A scenario similar to that described above results when a cache miss occurs during an operand fetch associated with one of the instructions executing in the pipeline. If an operand that is required for instruction execution is not available from cache, several clock cycles may elapse before the operand can be provided from a slower memory. In a lock-step pipeline design, instructions do not advance within the pipeline during these added clock cycles. This is true even if the preliminary stages of the pipeline have been partially emptied because of an instruction cache miss. Thus, fully overlapped execution can not be resumed until some time after the instruction associated with the operand cache miss has completed execution. This decreases system throughput.

The above examples illustrate that manner in which lock-step synchronous pipeline operation may, in some instances, create inefficiency. However, this occasional inefficiency has been considered an acceptable trade-off to the costly overhead and undue complexity associated with asynchronous designs. What is needed, therefore, is a synchronous pipeline design that incorporates some of the flexibility of asynchronous pipeline mechanisms without the added logic or reduced efficiency. This design should allow a first predetermined number of stages of a pipeline to operate in a manner that is independent from the operation of a second predetermined number of pipeline stages. The de-coupling of the first and second portions of the pipeline will allow instructions to enter the first portion of the pipeline so that instruction decode may begin while instruction execution for a second instruction is stalled or is undergoing extended execution within the second portion of the pipeline.

Objects:

It is the primary object of the invention to provide an improved synchronous pipeline design for controlling execution of the instruction set of a digital instruction processor;

It is a further object to provide a synchronous pipeline design having a first portion of the pipeline stages that operate independently from a second portion of the pipeline stages;

It is yet a further object to provide a synchronous pipeline design capable of inserting additional clock cycles into the pipeline for certain predetermined ones of the instructions in the instruction set while simultaneously receiving additional instructions for execution within the pipeline;

It is another object to provide a synchronous pipeline design capable of causing instructions to advance within a first portion of the pipeline in a manner that is independent from the manner in which instructions advance through the second portion of the pipeline;

It is yet another object to provide a synchronous pipeline design coupled to a storage device for storing a predetermined number of instructions that have been retrieved from memory prior to the time the instructions can be received by the pipeline;

It is still a further object to provide a synchronous pipeline design that allows empty stages in the pipeline to fill while execution is continuing on a instruction that is already resident within the pipeline; and It is yet another object to provide a pipeline design that allows processing to stall waiting for a predetermined condition to occur within a first portion of the pipeline while additional instructions continue to enter a second portion of the pipeline.

Other more detailed objectives will become apparent from a consideration of the Drawings and the Detailed Description of the Preferred Embodiment.

SUMMARY OF THE INVENTION

The foregoing objects are provided in a synchronous pipeline design that includes a first predetermined number of fetch logic sections, or "stages", and a second predetermined number of execution stages. Instructions are retrieved from memory and undergo instruction pre-decode and decode operations during the fetch stages of the pipeline. Thereafter, decoded instruction signals are passed to the execution stages of the pipeline, where the signals are dispatched to other execution logic sections to control operand address generation, operand retrieval, any arithmetic processing, and the storing of any result.

In general, instructions and the associated decoded instruction signals are passed from one logic section to the next within the pipeline at predetermined increments of time, which in the preferred embodiment is one period of the system clock. Typically, each logic section retains an instruction for processing for one clock cycle, then provides any processing results to a different logic section associated with a subsequent pipeline stage for continued processing. The timing requirements of each logic section are tuned to be similar to the requirements of the other logic sections within the pipeline for the majority of instructions in the instruction set so that instructions can be passed from one logic section to the next with optimal efficiency.

Although most instructions within the instruction set of the preferred embodiment can be executed during a standard number of clock cycles, predetermined ones of the instructions are extended-mode instructions that require additional processing cycles to complete. These additional processing cycles are controlled by a microcode-controlled sequencer rather than by the decoded instruction signals. Therefore, during the additional processing stages, the extended-mode instructions do not advance from one execution stage to the next within the pipeline, but are maintained within the microcode-controlled sequencer. Because the extended-mode instructions are not advancing within the execution stages of the pipeline, additional instructions do not enter the execution stages of the pipeline. In previous synchronous pipeline designs, this further prevented any instruction from entering any stage, including a fetch stage, of the pipeline.

The current system de-couples the fetch stages of the pipeline from the execution stages of the pipeline. Instructions are allowed to enter the fetch stages of the pipeline to begin pre-decode and decode operations regardless of whether execution is stalled within the execution pipeline stages. Within the fetch stages of the pipeline, an address generation logic section uses prediction algorithms to determine which instruction sequence will be executed next. The instructions in this predicted instruction sequence are retrieved from memory and stored within an instruction queue in preparation to begin execution. The queue allows up to a predetermined maximum number of instructions, which in the preferred embodiment is eight instructions, to be retrieved from memory to await execution. This instruction retrieval may continue whether or not all other stages of the pipeline are otherwise full. Because the queue can store the number of instructions needed to supply pipeline execution for at least eight clock cycles, an instruction cache miss can, in some instances, be made transparent to pipeline execution.

Instructions are retrieved from the queue on a first-in, first-out, basis. A retrieved instruction is provided to a pre-decode logic section within the fetch stages of the pipeline at a predetermined time determined by the system clock. If all fetch stages of the pipeline have not been completely filled, this instruction transfer occurs even when instructions have ceased advancing within the execution stages of the pipeline. For example, the pre-decode logic section may receive another instruction for processing if the pre-decode logic is able to pass any recently-processed instruction to the next fetch stage in the pipeline.

The pre-decode logic section generates hardware signals that are used by the next pipeline fetch stage, which is the decode stage, to complete the instruction decode process. The decode stage is capable of accepting an instruction for processing even in some instances in which extended-mode instruction execution is preventing instructions from advancing within the execution stages of the pipeline. During extended-mode operation, an instruction will advance to the decode logic section if this logic section is not otherwise processing a valid instruction.

From the foregoing description, the reader will appreciate that instructions continue to advance within all fetch stages of the pipeline until each of those fetch stages, including the pre-decode and decode logic stages, contains a respective instruction. Moreover, instruction retrieval will continue until the queue is full. Only then will instructions cease to enter the fetch stages of the pipeline until instruction execution resumes in a standard (non-extended) manner within the execution stages of the pipeline. The pre-decode and decode logic sections can complete pre-decode and decode operations, respectively, for the instructions resident in those stages during the extended-mode execution cycles. This maximizes system throughput by ensuring that completely overlapped pipeline execution will occur following the completion of the extended-mode execution cycles.

In addition to providing maximum efficiency in those cases related to extended-mode instruction execution, the current pipeline system also increases throughput in those situations in which an instruction is stalled in an execution stage of the pipeline because an operand required for the instruction execution is not available from cache memory. In these instances, execution of the instruction may not continue until the required operand becomes available. Because the execution of the instruction has effectively stalled within the pipeline, no additional instructions are allowed to enter the execution stages of the pipeline until execution can continue on the stalled instruction.

According to the current de-coupled pipeline design, even when execution has stalled in this manner, instructions are allowed to advance within the fetch stages of the pipeline until each of the fetch stages has received a respective instruction. Thus, pre-decode and decode stages of execution can be completed for the respective instructions even before normal pipeline execution resumes, and pipeline operation will be fully overlapped when the operand becomes available.

According to another aspect of the invention, the current pipeline system includes instruction flow control logic that allows instructions to advance within the fetch stages of the pipeline whenever a predetermined logic section within the execution pipeline stages is performing a predetermined function. In the preferred embodiment, instructions are allowed to advance within the fetch stages of the pipeline whenever the dispatch logic section included within the execution stages of the pipeline is performing a dispatch function. Whenever a dispatch function is completed, instructions are allowed to advance within the execution stages of the pipeline at a next predetermined time interval as dictated by the system clock. This allows the execution stages of the pipeline to accept another instruction for processing. Therefore, the occurrence of the dispatch function indicates that instructions may also advance within the fetch stages of the pipeline.

According to yet another aspect of the invention, the current pipeline system allows fetch stages of the pipeline to be cleared when a pipeline flush operation occurs. A pipeline flush operation is necessary when an unexpected execution branch operation occurs such that the predicted sequence of instructions that was previously fetched by the address generation logic section must be discarded. In this instance, all storage devices within the fetch stages of the pipeline are cleared such that unwanted pre-decode and decode hardware sequences are not propagated to the rest of the pipeline. This allows execution to begin immediately on the newly-fetched instructions.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

DETAILED DESCRIPTION OF THE PREFERRED EMBODIMENT

The Instruction Processor Environment of the Current Invention

Figure 1:
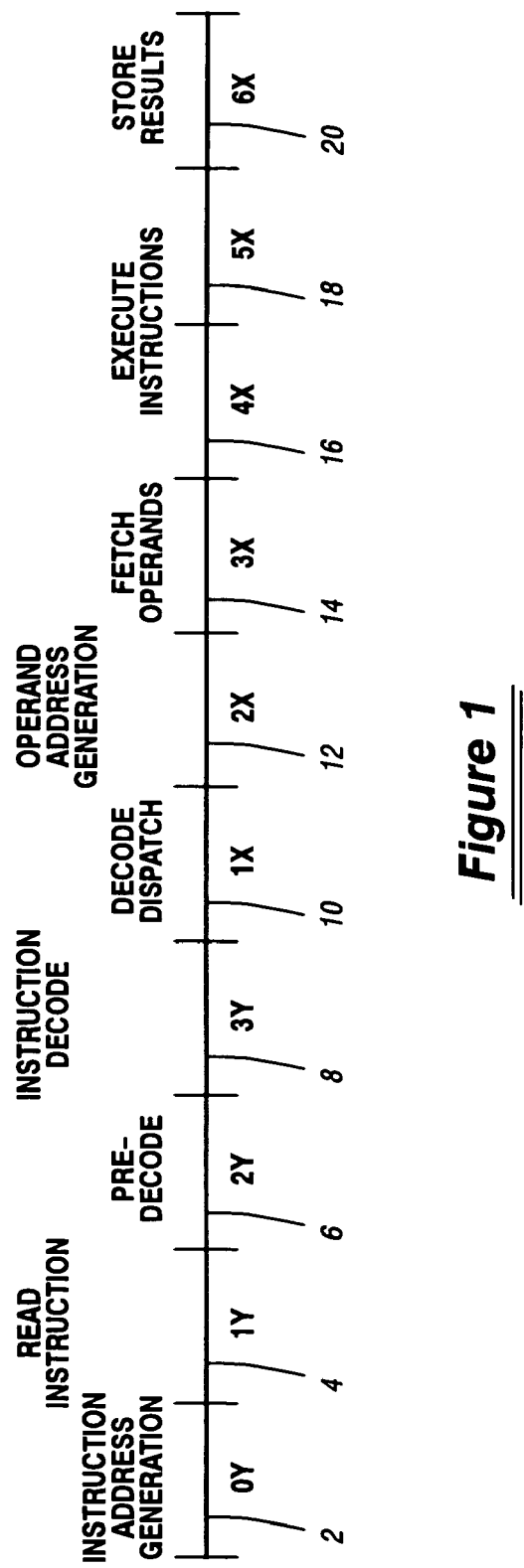
FIG. 1 is a timing diagram showing pipelined execution of an instruction by an exemplary Instruction Processor (IP)

FIG. 1 is a timing diagram showing pipelined execution of an instruction by an exemplary Instruction Processor (IP). Pipelined instruction execution is a method of increasing system throughput by dividing the execution of each instruction into functional operations that can be performed within different logic sections of the IP. Since each logic section of the IP can be processing somewhat independently from the other logic sections, the IP can be executing portions of several instructions at one time so that instruction execution is overlapped.

The timing diagram of FIG. 1 shows a standard instruction being divided into ten functional operations. Each of these functional operations may be referred to as stage of execution.

During the first stage, designated as the "0Y" stage 2, address generation occurs for the instruction. Next, the instruction is retrieved from cache memory during the "1Y" stage 4. Following instruction retrieval, decode of the instruction begins during the pre-decode stage shown as "2Y" stage 6. Instruction decode continues during "3Y" stage 8. During "1X" stage 10, the decoded instruction signals are dispatched to the various logic sections of the IP that perform instruction execution. Stage "2X" 12 is utilized primarily to generate any operand address that is required for instruction execution. During "3X" stage 14, the operand address is used to fetch the operand from cache memory. Stages "4X" and "5X", labeled 16 and 18, respectively, are generally devoted to executing the operations specified by the decoded instruction, and the "6X" stage 20 is used to store any results from the instruction execution.

In the pipeline architecture represented by the timeline of FIG. 1, stages 0Y, 1Y, 2Y, and 3Y are considered "instruction fetch" stages, and the actual instruction execution stages are the 1X through 6X stages. Since in this example, six standard instructions may be in instruction execution stages simultaneously during the 1X through the 6X stages, the illustrated pipeline architecture is said to represent a six-deep instruction pipeline. That is, while a first instruction undergoes decode dispatch during the 1X stage, operand address generation occurs for a second instruction during stage 2X. At the same time, operands for a third instruction are being retrieved, execution is occurring for fourth and fifth instructions, and any results produced by instruction execution are being stored for a sixth instruction.

Figure 2:
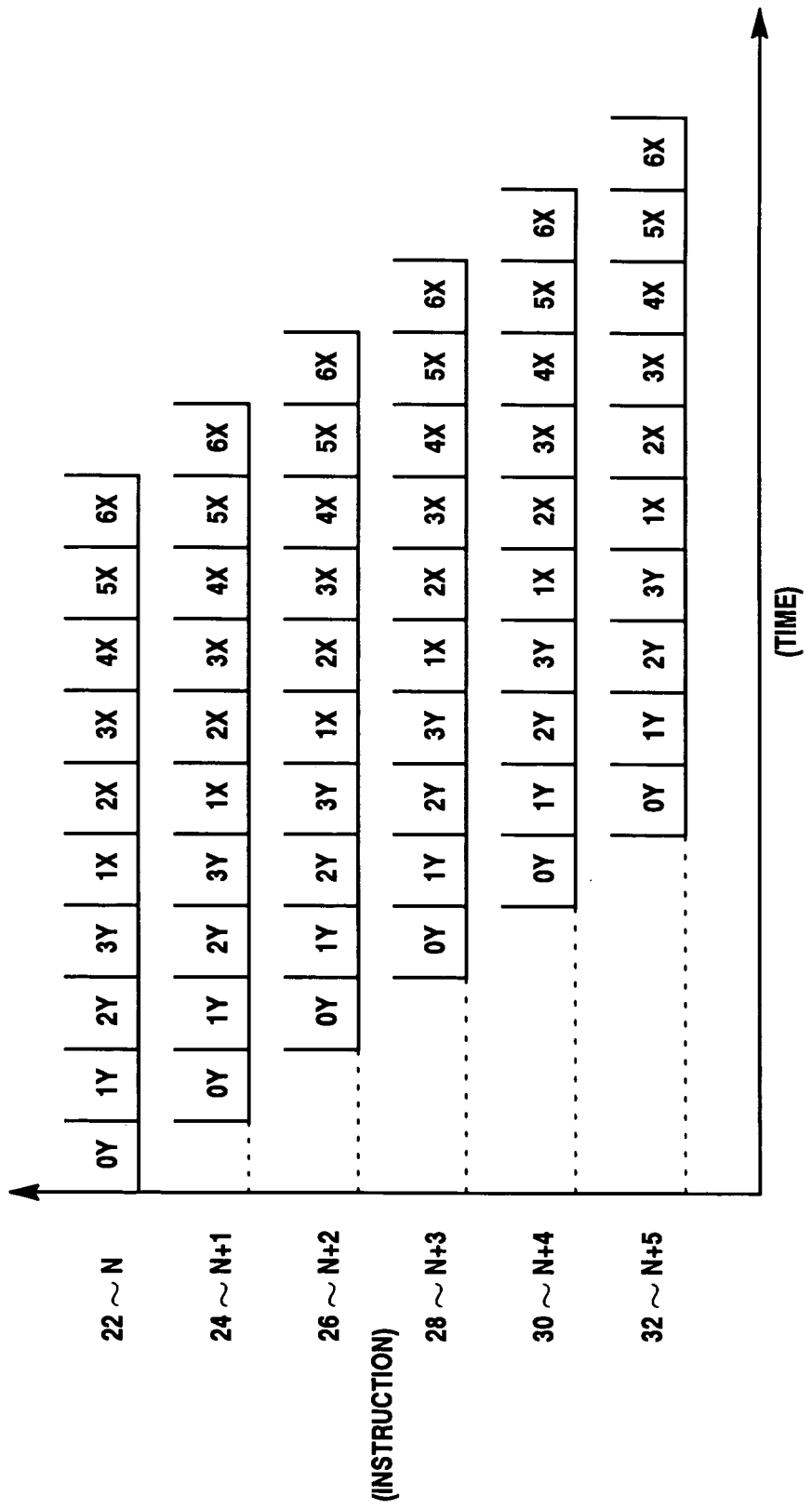
FIG. 2 is a timing diagram illustrating the pipeline instruction overlap of six consecutive standard instructions, N through N+5, in an instruction pipeline having the stages shown in FIG. 1.

FIG. 2 is a timing diagram illustrating the pipeline instruction overlap of six consecutive standard instructions, N through N+5, in an instruction pipeline having the stages shown in FIG. 1. Waveforms representing execution of these six instructions are labeled 22, 24, 26, 28, 30, and 32 respectively. The diagram represents fully overlapped execution for the four stages of instruction fetch 0Y through 3Y, and the six stages of instruction execution 1X through 6X. As stated above, during fully overlapped operation, one instruction completes every stage.

Figure 3:
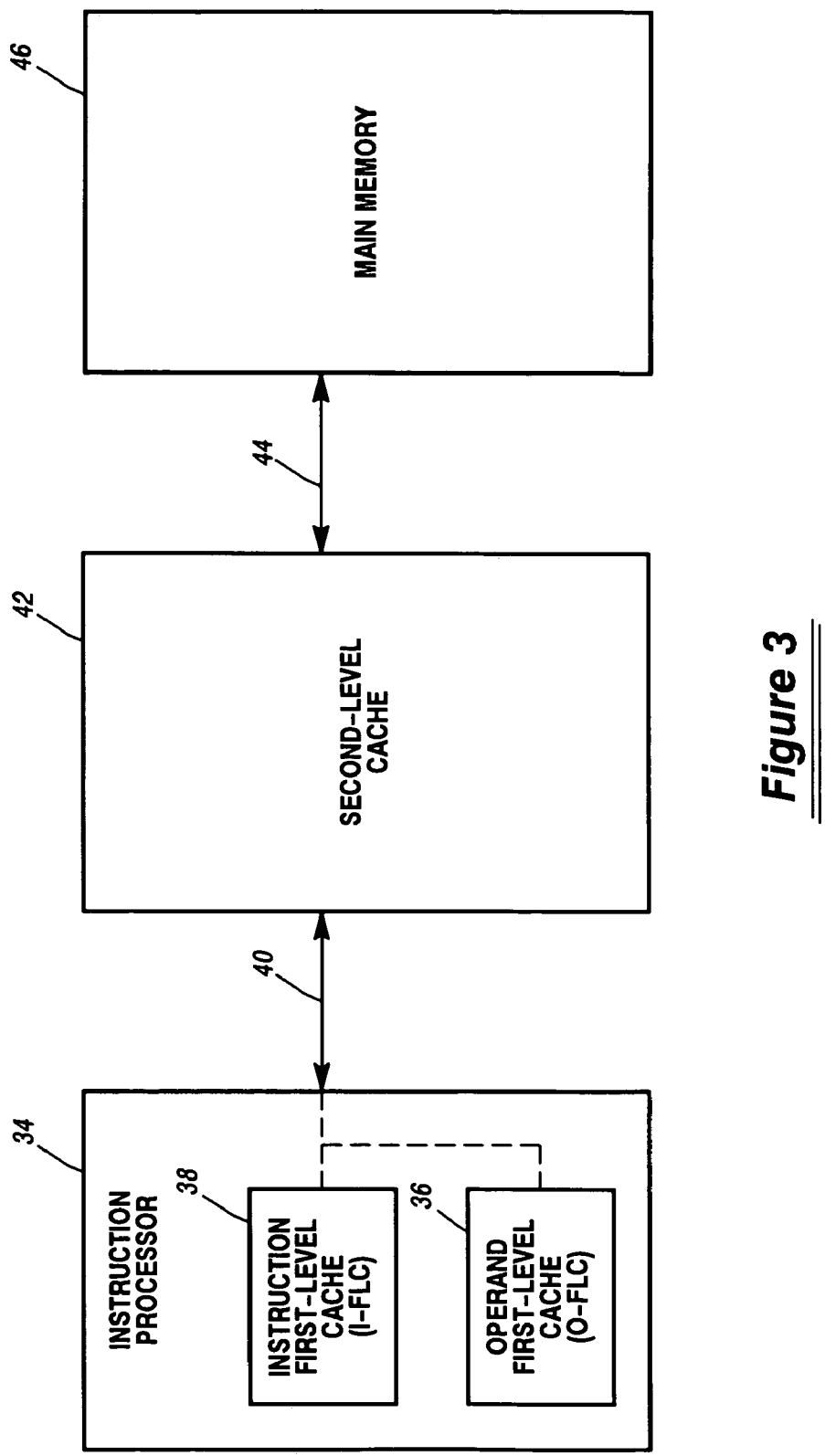
FIG. 3 illustrates the system environment of the current invention.

FIG. 3 illustrates the system environment of the current invention. The Instruction Processor (IP) 34 of the preferred embodiment includes both an Operand First-Level Cache (O-FLC) 36 and an Instruction First-Level Cache (I-FLC) 38. The O-FLC and I-FLC are relatively small, fast, memories for storing recently-used operands and instructions, respectively, in a manner known in the art, to speed instruction execution within the IP.

I-FLC and O-FLC are coupled via Interface 40 to a Second-Level Cache (SLC) 42 storing both instructions and operands. Requests for instructions or operands are made to the SLC when the instructions or operands are not located within the I-FLC 38 or the O-FLC 36, respectively. Similarly, the SLC 42 is coupled via Memory Interface 44 to additional storage shown as Main Memory 46. When a request is made to the SLC for an item not stored in the SLC, the request is forwarded to Main Memory 46 for processing. In the preferred embodiment, Main Memory 46 includes both a third-level cache and a main storage unit. The implementation details of Main Memory 46 are beyond the scope of this application.

Figure 4:
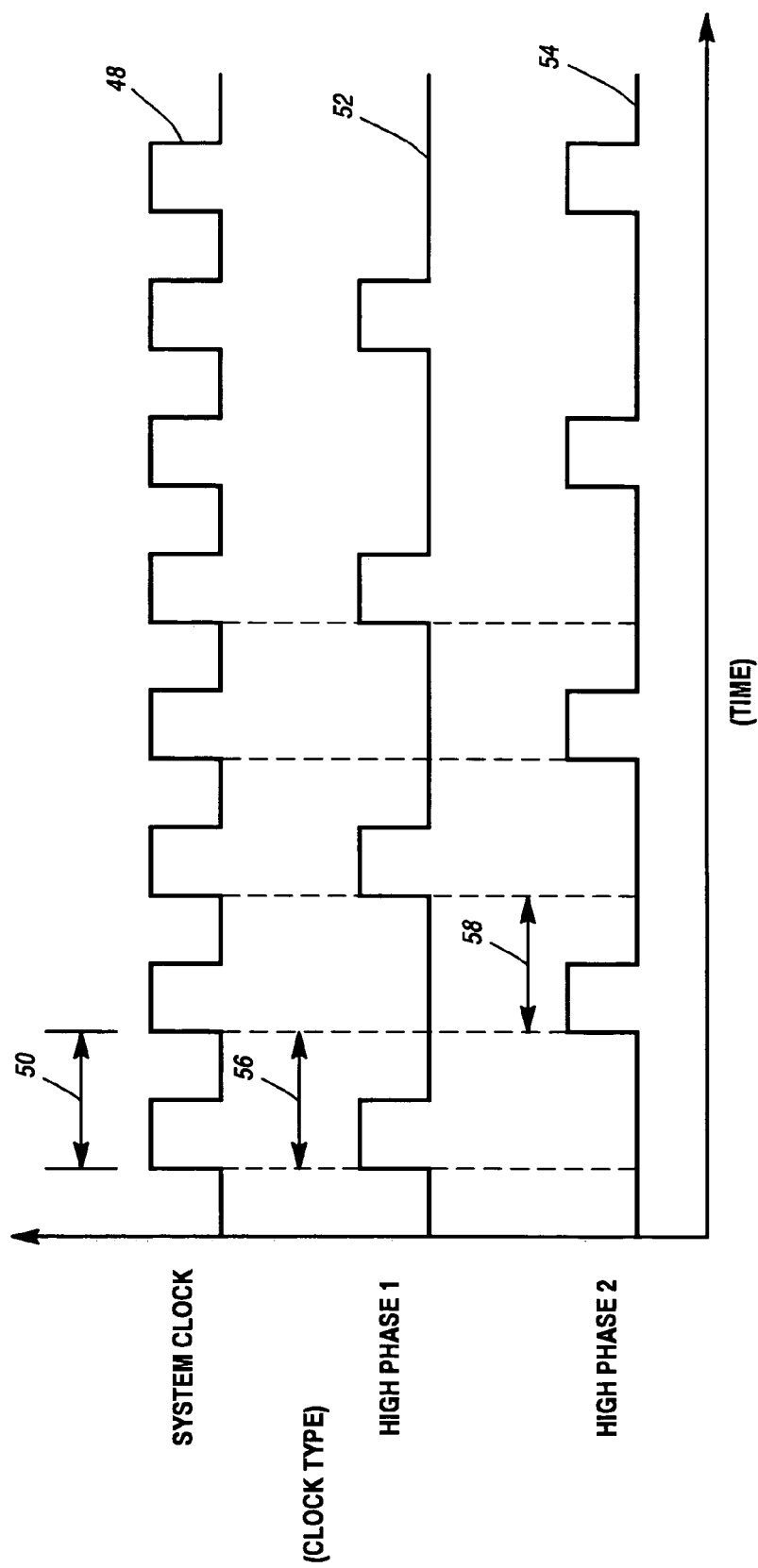
FIG. 4 is a timing diagram illustrating the clock signals associated with the IP logic of the preferred embodiment.

FIG. 4 is a timing diagram illustrating the clock signals associated with the IP logic of the preferred embodiment. The system clock shown in waveform 48 has a predetermined period 50. This system clock is used to generate all other clock signals in the system using a clock-generation scheme that is well-known in the art. Two of the clock signals used within the IP logic are represented by waveforms High Phase 1 52 and High Phase 2 54. The system clock periods associated with the high clock pulse of High Phase 1 and High Phase 2 can be referred to as Phase 1 56 and Phase 2 58 clock periods, respectively.

Figure 5:
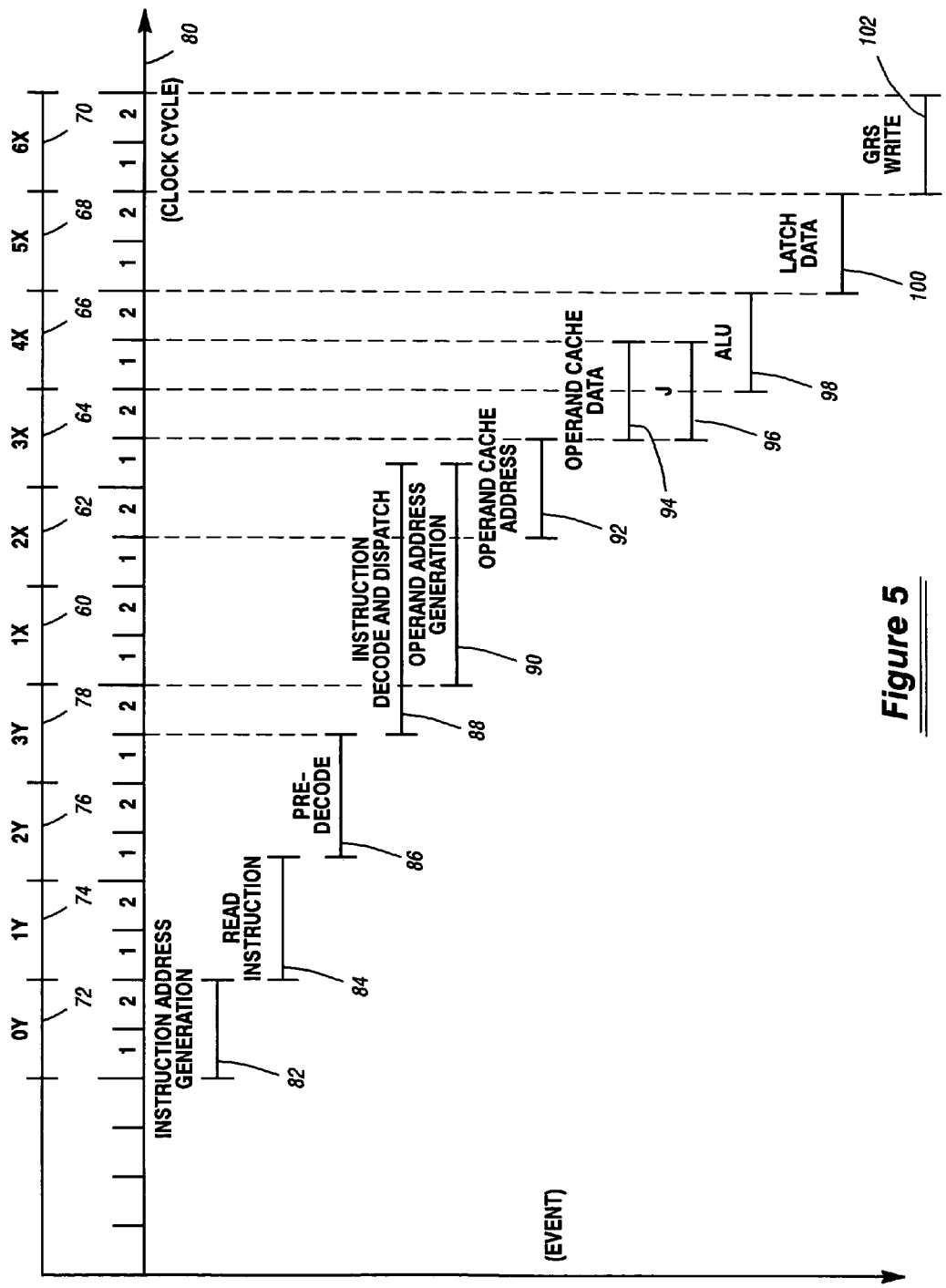
FIG. 5 is a timing sequence diagram illustrating the sequencing of a standard instruction through the instruction pipeline of the preferred embodiment.

FIG. 5 is a timing sequence diagram illustrating the sequencing of a standard instruction through the instruction pipeline of the preferred embodiment. The six execution stages 1X through 6X described above are labeled stages 60, 62, 64, 66, 68, and 70, respectively. The four additional instruction fetch stages 0Y through 3Y are label 72, 74, 76, and 78, respectively. Each of these stages is shown to have both a Phase 1 and a Phase 2 as is illustrated on Line 80. Hereinafter, a phase within one of the stages is referenced by indicating the stage following by the phase. For example, phase 1 of stage 1X is referred to as "1X1".

As mentioned above and illustrated by Line 82, address generation for an instruction occurs in the 0Y stage. This address is used to fetch the instruction from memory. In most situations when the addressed instruction is located in the I-FLC 38, the instruction is read from the I-FLC during the 1Y stage, as shown by Line 84. The instruction is provided to pre-decode logic that begins the instruction decode process in the 2Y stage, as illustrated by Line 86. Instruction decode continues during the 3Y stage, and decoded instruction signals are provided to various logic sections of the IP during the 1X stage. This is illustrated by Line 88. Additionally, operand address generation begins during the 1X stage for any operands required by the instruction as displayed by Line 90. By 2X2, the operand cache address is available for presentation to the O-FLC 36 as shown on Line 92. At 3X2, data from the O-FLC is available as illustrated by Line 94. Line 96 represents "per J shifting", which is an operation performed to determine whether the entire operand has been fetched.

At time 4X1, the Arithmetic Logic Unit (ALU) receives any fetched operand to be processed by the instruction, and also may receive operand data retrieved from one of the registers included within an internal IP register set called the General Register Set (GRS). The ALU processes the data during the 4X stage, and the results are latched during the 5X stage. This is shown by Lines 98 and 100, respectively. Finally, data is written back to the GRS during the 6X stage, as displayed by Line 102.

The timing sequence discussed above is a general illustration of the manner in which an instruction moves through the instruction pipeline of the preferred embodiment. The above discussion assumes that a standard (non-extended) instruction is being executed, and that the instruction requires some ALU processing to occur. It will be remembered that instruction sequences vary depending on the type of instruction being executed, and the functions and timing associated with the hardware sequences will therefore also vary somewhat. The above discussion also assumes the addressed instruction and required operands are available in the I-FLC 38 and O-FLC 36, respectively. If this is not the case, processing delays result, as will be discussed further below.

As mentioned above, FIG. 5 illustrates the execution of a "standard" (non-extended) instruction. This means that no additional microcode processing is necessary to complete execution of the instruction. Other instructions require that instruction execution be at least partially carried out under the control of a microsequencer within the IP. This microsequencer executes IP microcode that controls the various logic sections of the IP. When this type of execution is required, additional "extended-mode" stages must be inserted into the instruction processing time-line. This increases the time required for an instruction to complete execution, and also suspends the overlap of instruction execution within the IP pipeline.

Figure 6:
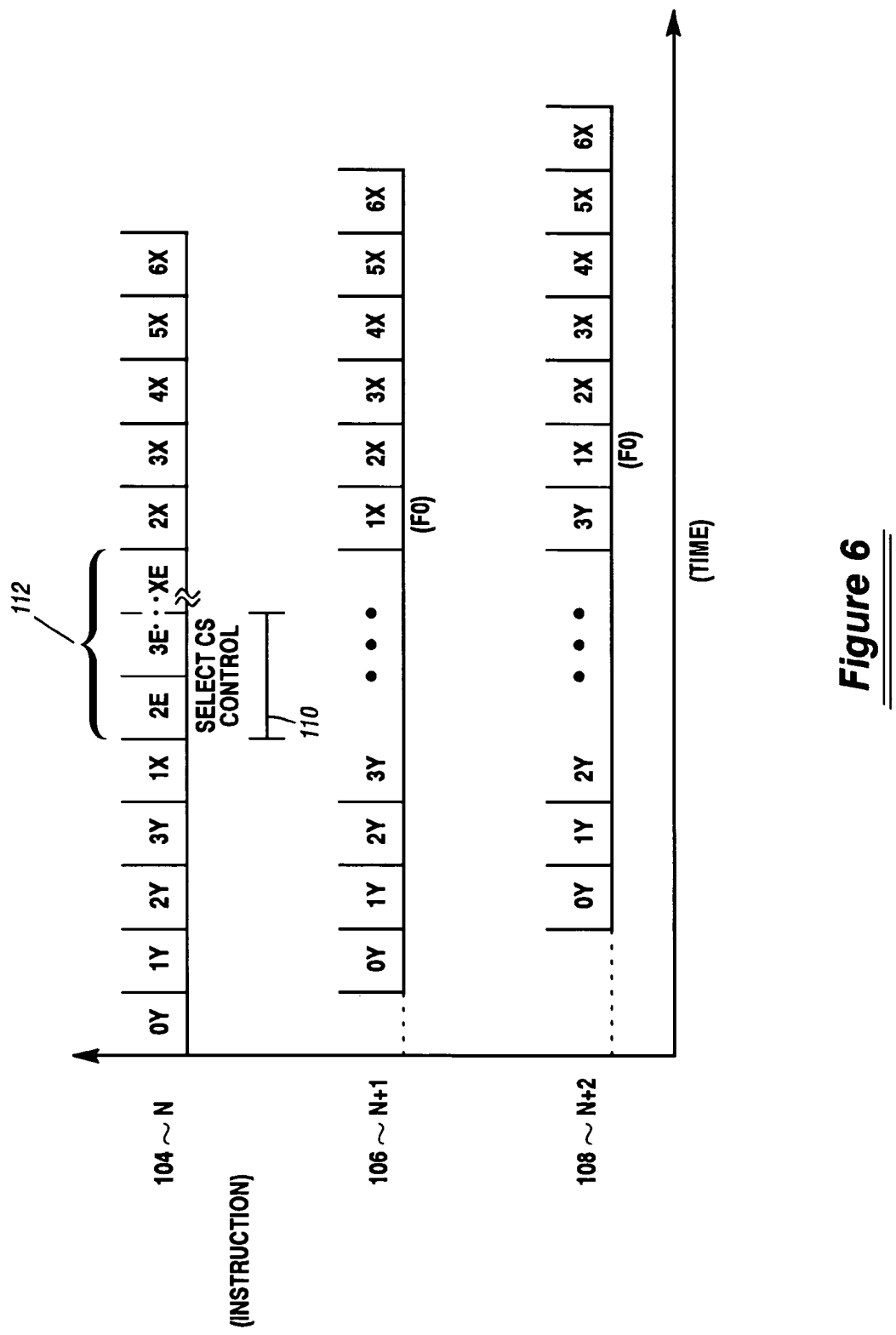
FIG. 6 is a timing diagram illustrating the suspension of instruction execution within the pipeline when an extended-cycle instruction is executed.

FIG. 6 is a timing diagram illustrating the suspension of instruction execution within the pipeline when an extended-cycle instruction is executed. Three consecutive instructions N 104, N+1 106, and N+2 108 are shown. Instruction N 104 is the extended-cycle, or "extended-mode", instruction. During execution of an extended-mode instruction, a control signal called "Select CS Control" activates during phase 2 of stage 1X, as indicated by Line 110. The activation of Select CS Control prevents the decoded instruction signals for instruction N+1 104 from being dispatched to the various IP logic sections during stage 1X of instruction N+1. This allows execution to continue under microcode control on the Nth instruction for a variable number of additional cycles 112. These additional cycles are illustratively shown as 2E, 3E, and 4E, but more extended cycles could occur. The Select CS Control signal remains active until the beginning of the last additional cycle, as shown by Line 110. After the Select CS Control signal deactivates, the next instruction N+1 106 can be loaded for decode and normal pipeline execution is resumed. The execution of extended-mode instructions will be discussed further below in reference to the pipeline architecture of the current invention.

Figure 7:
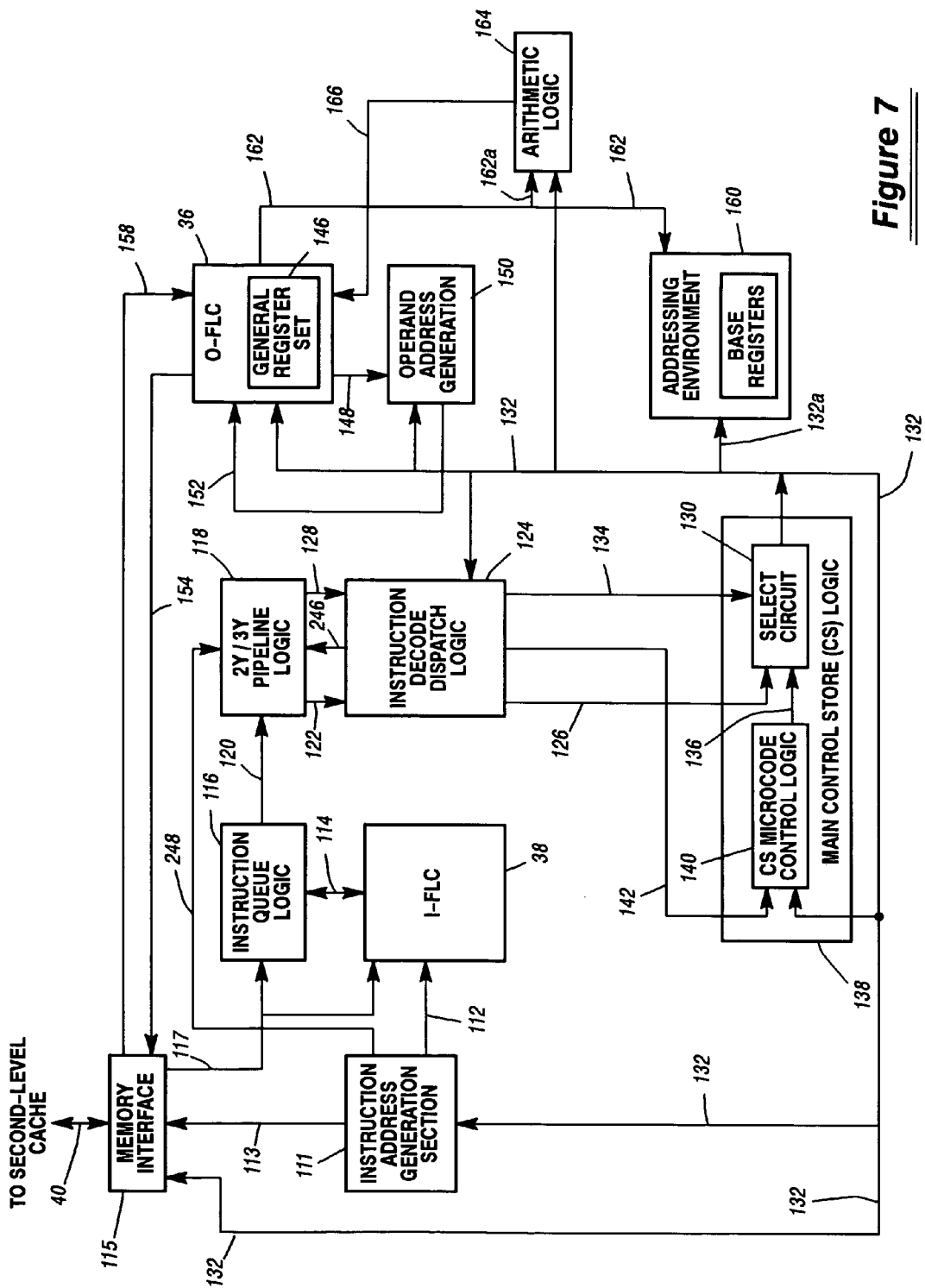
FIG. 7 is a block diagram of the major sections of an Instruction Processor of the preferred embodiment.

FIG. 7 is a block diagram of the major sections of an Instruction Processor of the preferred embodiment. Although this diagram does not provide a complete view of all data, address, and control paths, a subset of these paths is shown to facilitate an understanding of how the various IP sections interact.

The IP of the preferred embodiment includes an Instruction Address Generate Section 111 that provides logic that generates an absolute instruction address by adding a relative address to the address of a designated base register within the IP. The absolute instruction address is provided to a tag memory (not shown in FIG. 7) to determine if the addressed instruction is located in the I-FLC 38. If the instruction is resident in the I-FLC, the address is provided on Line 112 to the I-FLC so the addressed instruction may be retrieved and provided on Line 114 to the Instruction Queue Logic 116. If the address is not resident in the I-FLC, the address is provided on Line 113 to Memory Interface 115, which forwards the address on Line 40 to the Second-Level Cache 42. When the instruction becomes available, it is provided to the I-FLC and to the Instruction Queue Logic 116 on Line 117. In this instance, some processing delay is introduced into the instruction pipeline, as will be discussed below.

In general, an instruction is stored in Instruction Queue Logic 116 prior to entering the 2Y and 3Y stages of the pipeline. Instruction Queue Logic includes a storage device that stores a predetermined number of instructions, which in the preferred embodiment is eight. Each retrieved instruction remains stored in the Instruction Queue Logic until it enters stage 2Y for pre-decode. If the Instruction Queue Logic does not store any instructions, an instruction read from the I-FLC 38 is provided immediately to the pre-decode logic without first being stored in the Instruction Queue Logic, as will be discussed further below.

Pre-decode and decode of an instruction during the 2Y and 3Y stages, respectively, are performed by the 2Y/3Y Pipeline Logic 118. This logic receives an instruction from the Instruction Queue Logic 116 via the interface shown as Line 120. This logic performs the decode operations that generate the hardware signals to control instruction execution. The 2Y/3Y Pipeline Logic 118 will be discussed in more detail below.

2Y/3Y Pipeline Logic 118 provides hardware signals on Line 122 to Instruction Decode Dispatch Logic 124 at time 1X1, which, in turn, forwards these signals to the rest of the IP on Line 126. Additionally, 2Y/3Y Pipeline Logic provides the instruction on Line 128 to Instruction Decode Dispatch Logic so that it can be stored, and further decode operations can be performed by Instruction Decode Dispatch Logic 124 to generate additional hardware control signals.

For standard instructions, the signals provided by Instruction Decode Dispatch Logic 124 via Line 126 are selected by Select Circuit 130 to be provided to all parts of the IP on Line 132. As discussed previously, these signals provide the hardware control sequences necessary to complete execution of the standard instruction. Selection of the signals on Line 126 is controlled by the Select CS Control Signal on Line 134 generated by the Instruction Decode Dispatch Logic 124 and mentioned previously in reference to FIG. 6. For non-standard instructions, the Select CS Control Signal instead selects signals on Line 136 to be provided to the various IP logic sections. The signals on Line 136 are generated by Main Control Store (CS) section 138. Main Control Store Section includes CS Microcode Control Logic 140, which is a microcode-controlled sequencer that is initially enabled by address and control signals provided on Line 142 by Instruction Decode Dispatch Logic 124. The microcode-controlled sequencer executes microcode instructions stored within a memory device embedded within the Main Control Store Section. The signals on Line 136 control IP execution during the extended execution cycles for non-standard instructions. For more information on microcode-controlled pipeline execution of extended-mode instructions, see U.S. Pat. No. 5,577,259 to Alfemess et al. entitled "Cooperative Hardware and Microcode Control System for Pipelined Instruction Execution", assigned to the assignee of the current invention.

As stated previously, the control signals on Line 132 are provided to all sections of the IP to control instruction execution. These control signals include addresses that are stored in the General Register Set (GRS) 146. These addresses are provided over lines 148 to the Operand Address Generate Section 150. In response, the Operand Address Generate section 150 generates an operand absolute address, which is transferred to the Operand First-Level Cache (O-FLC) 36 on lines 152. After the absolute operand address has been received by the O-FLC 36, the O-FLC logic determines whether the operand is resident in the O-FLC. If the operand is not resident, the IP suspends instruction execution and initiates a memory read over lines 154 to the Memory Interface 115. In response, Memory Interface initiates a request to the SLC 42 over Interface 40.

After the operand is returned on Interface 40 to Memory Interface, the operand is provided to the O-FLC 36 on Line 158.

If an O-FLC hit occurs, or after execution has resumed in the case of an operand cache miss, the operand data is available at 3X2 time. This data is provided to the Addressing Environment logic 160 over path 162, where it is used in conjunction with the addressing signals provided on Line 132a to generate the next operand cache address. Operand data is further made available over Line 162a to the Arithmetic Logic 164 during the end of the 3X stage. The Arithmetic Logic 164 performs the multiply/divide, floating point, and decimal arithmetic operations for the machine during the 4X stage. The results are stored back to GRS 146 over Line 166 during the 6X stage.

The above description provides an overview of the manner in which control passes to the various IP logic sections of the preferred embodiment during pipelined execution of an instruction. In prior art synchronous pipeline designs, this flow of control occurs in a lock-step manner for each of the instructions in the pipeline. In other words, instruction execution of an instruction N+1 only proceeds to the next stage when the instruction execution for the instruction N also proceeds to the next stage, wherein instruction N is the instruction entering the pipeline immediately before instruction N+1 enters the pipeline. This lock-step approach is implemented because it simplifies execution control, and because it provides adequate machine performance in many instances. However, the use of a lock-step, synchronous pipeline design can cause execution delays in some situations in which a cache miss occurs to the I-FLC 38. This will be discussed in detail in reference to the following timing diagrams.

Figure 8:
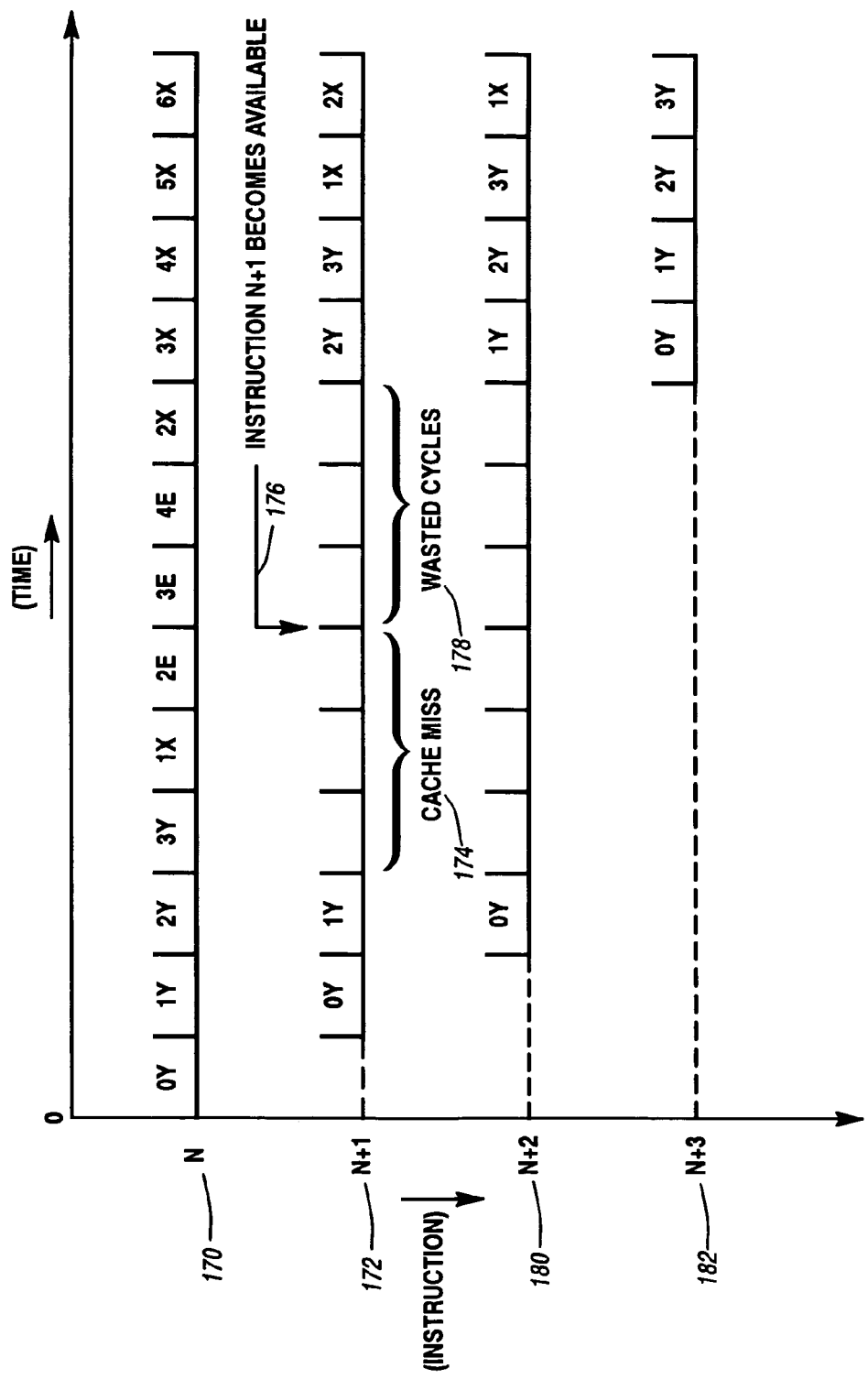
FIG. 8 is a timing diagram illustrating execution of a prior art pipeline design when a cache miss occurs to the Instruction First-Level Cache during execution of an extended-mode instruction.

FIG. 8 is a timing diagram illustrating execution of a prior art pipeline design when a cache miss occurs to the Instruction First-Level Cache during execution of an extended-mode instruction. Execution of extended-mode instruction N is represented by waveform 170. Following execution of stage 0Y of instruction N, stage 0Y for instruction N+1 begins, as shown by waveform 172. As discussed above, this stage involves generating the instruction address. Assume, however, that the addressed instruction is not resident in the I-FLC for instruction N+1, and three additional clock cycles are therefore required to obtain the instruction from the SLC 42, as shown by Arrow 174. That is, stage 1Y for instruction N+1 actually requires four clock cycles to complete. Thus, the instruction N+1 is not available until the time indicated by Arrow 176. However, when the instruction N+1 become available from the SLC, extended-mode instruction execution is occurring for extended-mode instruction N. As discussed above, this extended-mode instruction execution effectively stalls the pipeline because instruction N does not continue advancing through the pipeline until extended-mode execution is complete. Because the pipeline operates in a lock-step manner, instruction N+1 is not allowed to advance within the pipeline after this instruction becomes available. As a result, time that could otherwise be spent completing the 2Y and 3Y stages of instruction N+1 execution is wasted, as shown by Arrow 178. Waveforms 180 and 182 show how the stalled pipeline also affects execution of subsequent instructions N+2 and N+3, respectively. Fully pipelined execution is not resumed until four clock cycles after the instruction N has completed execution. That is, four clock cycles will elapse following execution completion of instruction N before instruction N+1 completes execution and the pipeline is again executing in fully-overlapped mode. This decreases system throughput.

Figure 9:
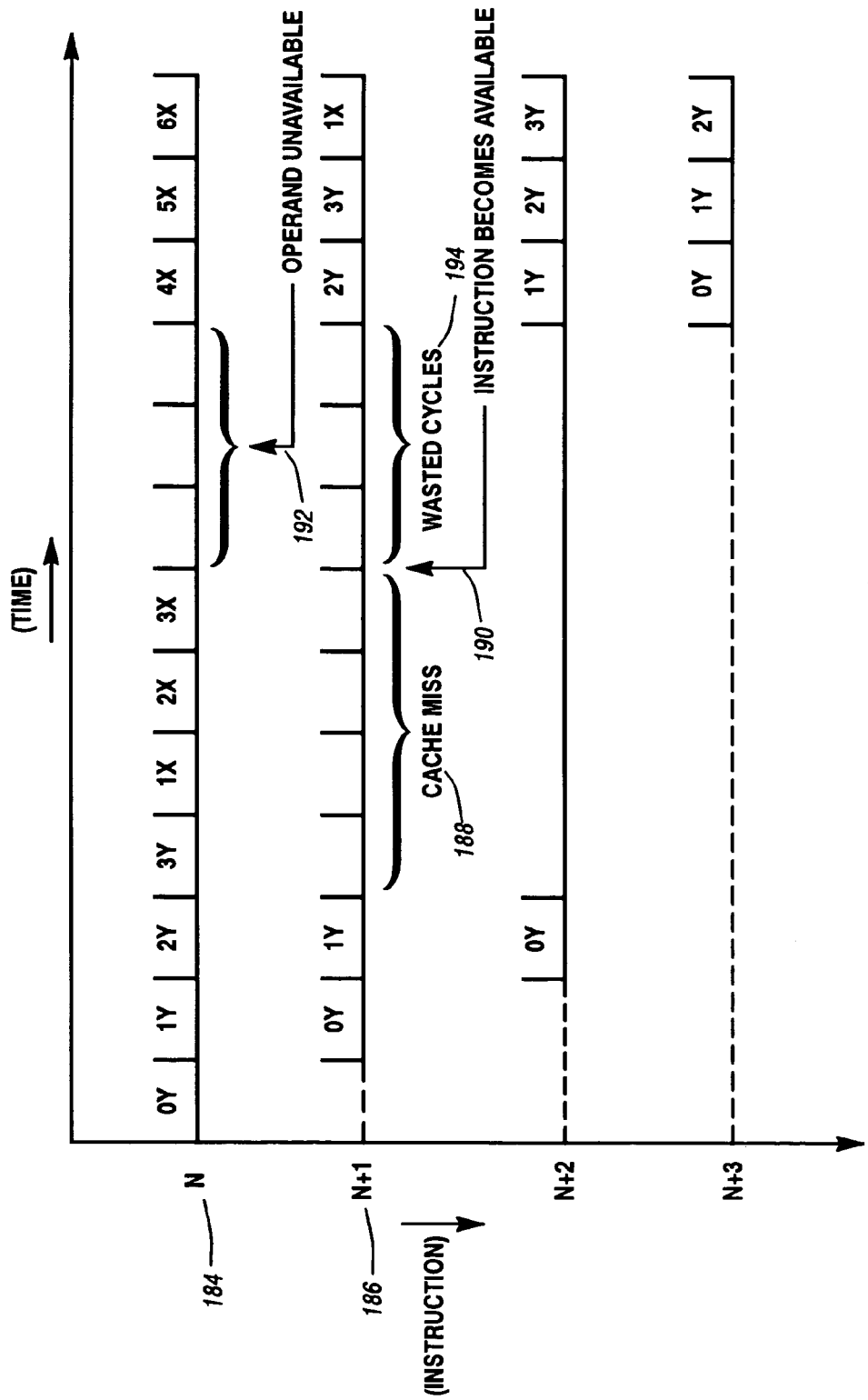
FIG. 9 is a timing diagram illustrating execution of a prior art synchronous pipeline design when a cache miss occurs to the Instruction First-Level Cache for a first instruction while another cache miss occurs to the Operand First-Level Cache for the preceding instruction N.

FIG. 9 is a timing diagram illustrating execution of a prior art synchronous pipeline design when a cache miss occurs to the Instruction First-Level Cache for a first instruction while another cache miss occurs to the Operand First-Level Cache for the preceding instruction N. In a manner similar to that discussed above with respect to the foregoing example, the scenario presented in FIG. 9 results in execution inefficiency as follows.

Execution of instruction N is represented by waveform 184. Following execution of stage 0Y of instruction N, stage 0Y for instruction N+1 begins, as shown by waveform 186. Addressed instruction N+1 is not resident in the I-FLC, and in this instance, five additional clock cycles are required to obtain the instruction from the SLC 42, as shown by Arrow 188. Instruction N+1 becomes available at the time indicated by Arrow 190. However, when the instruction N+1 become available from the SLC, pipelined execution for instruction N has stalled because the operand required to complete execution of instruction N was not resident in the O-FLC 36. As a result, three additional clock cycles are required before stage 4X of instruction execution can resume for instruction N. This is indicated by Arrow 192. Because of the lock-step operation of the prior art pipeline design, instruction N+1 does not advance in the pipeline during the stalled clock cycles, as shown by Arrow 194. Thus, stage 2Y execution for instruction N+1 does not begin until instruction N advances to stage 4X. After instruction N completes execution, stages 2X through 6X must be executed to complete execution of instruction N+1. Thus five clock cycles will elapse before instruction N+1 exits the pipeline, slowing processor throughput. If the pipeline were operating in a fully overlapped manner, five standard instructions could complete execution during this time.

The prior art pipeline design creates inefficiencies in certain circumstances because of the lock-step operation of all stages of the pipeline. When a pipeline stall occurs in any portion of the pipeline, instructions that entered the pipeline following the stalled instruction are also not allowed to advance. The current invention addresses this inefficiency by de-coupling the operation of the fetch stages 0Y through 3Y of the pipeline with the latter execution pipeline stages 1X through 6X.

Description of the Pipeline Design of the Preferred Embodiment

Figure 10:
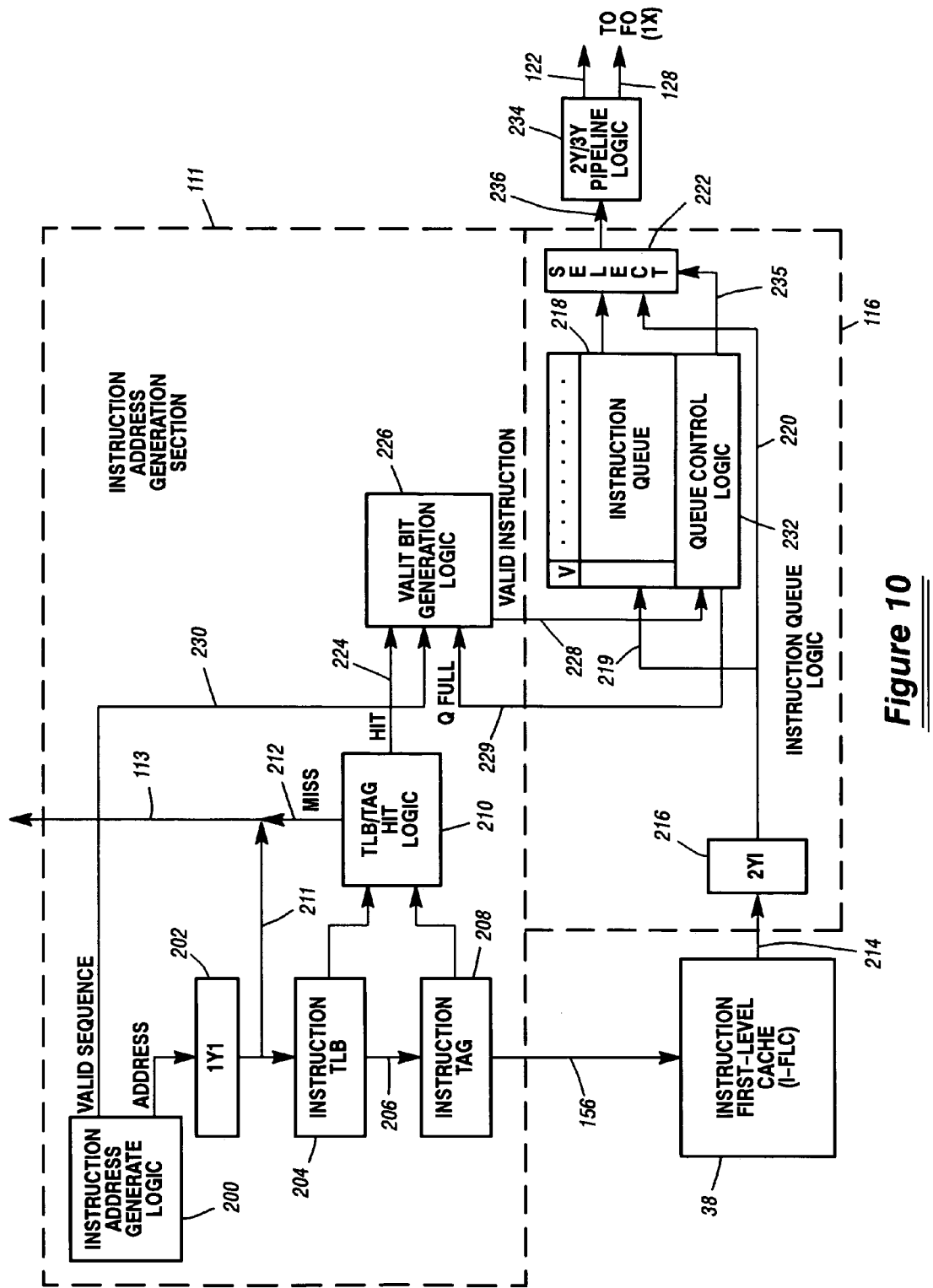
FIG. 10 is a block diagram of the logic included in stages 0Y through 3Y of the current pipeline design.

FIG. 10 is a block diagram of the logic included in stages 0Y through 3Y of the current pipeline design. As discussed previously, Instruction Address Generation Section 111 generates an address that is provided to the I-FLC 38 to obtain the next instruction to execute. The actual address generation is performed by Instruction Address Generate Logic 200. This logic includes circuits to predict which sequence of instructions, and which instruction in particular, will be executed next. The predicted address is latched into Storage Device 202 at time 1Y1. This predicted address is provided to the Instruction Translation Look-ahead Buffer (TLB) 204 to determine if the address is likely stored in cache. The Instruction TLB stores a list of all pages of the Main Memory 46 that have been stored in the I-FLC 38, wherein each page of memory includes a predetermined number of addressable memory locations. In the preferred embodiment, each page of memory is 32 K bytes in length.

If an addressed instruction is included is a page of memory that has been stored in the I-FLC, the generated instruction address is provided by the Instruction TLB 204 on Line 206 to the Instruction Tag 208. The Instruction Tag Logic includes a record of any addresses that have been invalidated within the cache. Certain operations such as storage locks may cause an address to be off-limits, either temporarily or permanently, within a particular cached page of memory.

In the event of a cache miss, either because the addressed page of memory is not stored in the I-FLC 38 as indicated by the Instruction TLB, or because an invalidation operation occurred to invalidate a cached address in the I-FLC as indicated by the Instruction Tag 208, the addressed instruction must be retrieved from another memory. The TLB/Tag Hit Logic 210 provides an indication of the miss on Line 212. This miss indication is provided along with the instruction address provided on Line 211 to the SLC 42 on Line 113.

If a cache miss did not occur and the address is present in cache, the addressed instruction is read on Line 214 from the I-FLC 38, and is provided to Instruction Queue Logic 116. Upon being provided to Instruction Queue Logic 116, the instruction is stored in Storage Device 216 at time 2Y1. This instruction will either be provided to the Instruction Queue 218 storage device on Line 219, or will be provided on Line 220 directly to the Select Circuit 222 as will be discussed below. Instruction Queue stores up to a predetermined maximum number of instructions that have been retrieved from the I-FLC or other system memory and that are waiting to enter the 2Y and 3Y stages of instruction processing. In the preferred embodiment, this predetermined maximum number is eight.

At approximately the same time an instruction is being provided to the Instruction Queue 218, a cache hit indication is provided by TLC/Tag Hit Logic 210 on Line 224 to Valid Bit Generation Logic 226. Valid Bit Generation Logic generates a valid instruction signal on Line 228 to the Instruction Queue if a valid instruction is available in Storage Device 216 and if the Instruction Queue is not already full as is signaled by the Q Full Signal on Line 229. Valid Bit Generation Logic determines that a valid instruction is available in Storage Device 216 by sensing the assertion of the hit indication on Line 224, and by further sensing that a valid instruction read sequence is being executed. The execution of the valid instruction read sequence is signaled by the assertion of the valid sequence signal on Line 230.

Valid Bit Generation Logic generates the valid instruction signal on Line 228, which is provided to Queue Control Logic 232. Queue Control Logic controls storage of the instruction provided on Line 219 into Instruction Queue 218. An instruction is stored in Instruction Queue 218 along with a valid-bit signal indicating that the entry is a valid pending instruction. As mentioned previously, an instruction is only stored in Instruction Queue if other instructions are also stored in the Instruction Queue waiting to enter the 2Y stage of execution. Otherwise, if the Instruction Queue is empty, the instruction is provided directly on Line 220 to Select Circuit 222, and is forwarded to the 2Y/3Y Pipeline Logic 234. This allows an instruction to enter stage 2Y immediately after being read from the I-FLC if no other instructions are pending in the Instruction Queue. Selection control for Select Circuit 222 is provided by Queue Control Logic 232 on Line 235.

Instructions stored in the Instruction Queue 218 are processed on a first-in, first-out basis. The oldest stored instruction is the next instruction to be retrieved by Queue Control Logic 232 and provided to Select Circuit 222 for presentation to the 2Y/3Y Pipeline Logic 234 on Line 236. 2Y/3Y Pipeline Logic performs the pre-decode and decode stages of instruction execution in a manner that is independent from pipeline execution during the 1X through 6X stages, as will be discussed below.

Figure 11:
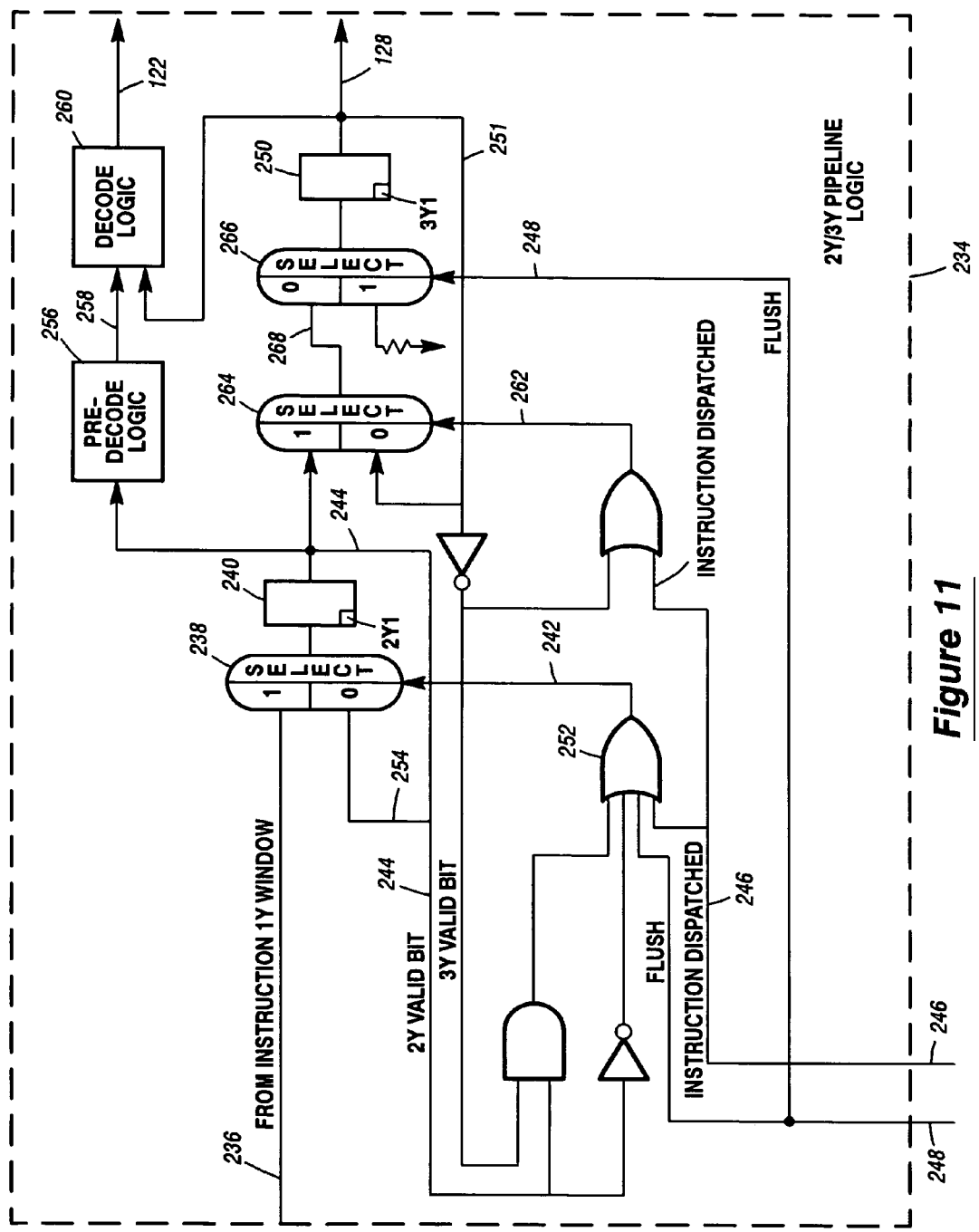
FIG. 11 is a block diagram of the 2Y/3Y Pipeline Logic.

FIG. 11 is a block diagram of the 2Y/3Y Pipeline Logic 234. Instructions read from Instruction Queue 218 are provided on Line 236 along with the associated valid-bit designator to Select Circuit 238. The instruction provided on Line 236 is selected to be stored in Storage Device 240 at time 2Y1 to begin the pre-decode stage of execution in one of several situations, as is controlled by the signal on Line 242. According to one scenario, the instruction provided on Line 236 is selected by Select Circuit 238 if a valid instruction is not present in Storage Device 240 as is determined by the absence of an associated valid-bit indicator on Line 244 provided on the wrap-back path from Storage Device 240. Thus, an instruction can enter the 2Y stage of instruction execution on the rising edge of a system clock at time 2Y1 because no other instruction is already resident in this stage.

This situation occurs when a cache miss situation to the I-FLC 38 results in the initial stages of the pipeline being emptied as described in reference to FIGS. 8 and 9 above.

According to another scenario, the instruction on Line 236 is selected for storage in Storage Device 240 if an instruction completes stage 1X, or is "dispatched". This is indicated by the assertion of the instruction dispatched signal on Line 246, as is provided by the Instruction Decode Dispatch Logic 124. An instruction is latched into the Storage Device 240 in this situation because the dispatch of an instruction will cause all instructions resident in stages 1X through 6X to advance so that the execution stages of the pipeline can accept another instruction. As a result, all instructions within the fetch stages 0Y through 3Y of the instruction pipeline also may advance.

According to still another scenario, it may be determined that the instructions resident in the pipeline must be flushed. This could occur, for example, because an unexpected re-direction occurred within the executing sequence of instructions as may be caused by the execution of a "JUMP" instruction. In such situations, all instructions that were previously fetched from memory for execution must be discarded and a different sequence of instructions retrieved for execution.

The pipeline is flushed when the Instruction Address Generation Section 111 asserts the flush signal on Line 248, which allows a newly-fetched instruction on Line 236 to enter stage 2Y as soon as the instruction becomes available. The assertion of this signal results in all pipeline storage devices including Storage Devices 240 and 250 of FIG. 11 to discard any previously-stored instructions.

Finally, the instruction on Line 236 is allowed to enter the 2Y stage of execution when the valid-bit indicator for the instruction stored in Storage Device 240 is asserted on Line 244, and another valid-bit indicator for an instruction stored in Storage Device 250 is not asserted. This second valid-bit indicator, which is stored along with the associated instruction in Storage Device 250, is provided on the feedback path for Storage Device 250 shown as Line 251. Storage Device 250 stores an instruction that has entered the 3Y stage of execution. Thus, this scenario corresponds to the case in which the instruction in the 2Y stage of execution will advance to the 3Y stage of execution during the next system clock period because that stage was previously empty. This transfer of instructions occurs whether or not an instruction is dispatched. This allows another instruction to be received by Storage Device 240 to undergo the 2Y stage of execution.

As stated above, the selection control signal on Line 242, which is provided by OR Circuit 252, allows instruction execution to advance between stages 1Y and 2Y independently of the processing activity occurring in the more advanced stages of the pipeline. In the event that stages 2Y and 3Y are both occupied by an instruction and instruction dispatch is not occurring because pipeline execution has stalled, Storage Device 240 retains the instruction that had been stored during the previous system clock cycle. This previously-latched instruction is provided on the feed-back path shown as Line 254 and is selected by the de-assertion of the selection control signal on Line 242.

The above description illustrates the manner in which an instruction advances from stage 1Y to 2Y according to the selection control on Line 242. When an instruction enters stage 2Y, it becomes available to be processed by Pre-Decode Logic 256. Pre-Decode Logic begins the instruction decode process, generating control signals on Line 258 that are provided to Decode Logic 260 for use when the associated instruction enters stage 3Y.

In a manner that is similar to that described above with respect to stage 2Y, selection control signal on Line 262 is provided to Select Circuit 264 to control the manner in which an instruction advances from stage 2Y to 3Y. According to a first scenario, this occurs when an instruction is dispatched from stage 1X as is indicated by the assertion of the instruction dispatched signal on Line 246. According to a second scenario, this also occurs when a valid instruction is not present in the 3Y stage, as would occur if a previous cache miss to the I-FLC 38 had partially cleared the pipeline.

When an instruction advances from stage 2Y to 3Y, it must also be selected by Select Circuit 266. Select Circuit selects the instruction on Line 268 when a flush operation is not occurring, as controlled by the de-activation of the flush signal on Line 248. When a flush operation is occurring, Select Circuit instead selects the "tied-low" inactive signals on the alternative input so that Storage Device 250 is effectively cleared. This prevents any inadvertent and undesired decode sequences from being initiated on Line 122 by Decode Logic 260 during the pipeline flush operation.

Figure 12:
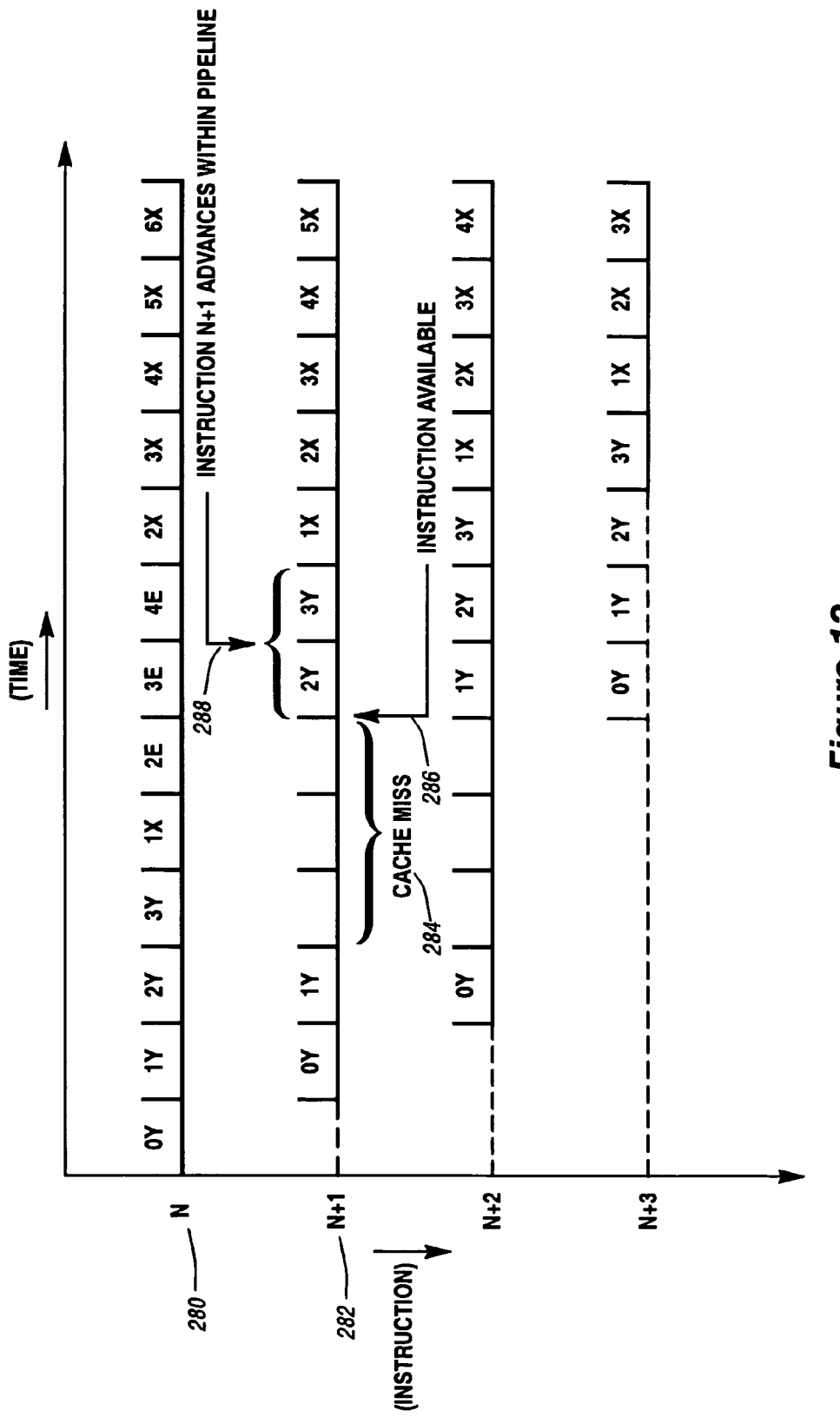
FIG. 12 is a timing diagram illustrating the manner in which the current pipeline design increases processing efficiency when an extended-mode instruction is executing while an instruction cache miss is occurring for a subsequently-addressed instruction.

FIG. 12 is a timing diagram illustrating the manner in which the current pipeline design increased processing efficiency when an extended-mode instruction enters the instruction pipeline prior to the occurrence of a cache miss. Execution of the extended-mode instruction N is represented by waveform 280. Execution of the next subsequent instruction N+1 is represented by waveform 282. A cache miss occurs when the address for instruction N+1 is provided to the I-FLC 38, as shown by Arrow 284. The instruction is not available from the SLC 42 until after instruction N has entered extended-mode execution stages, as indicated by Arrow 286. However, because the current pipeline design de-couples execution of the preliminary pipeline stages from stages 1X through 6X, the instruction N+1 is allowed to advance to stages 2Y and 3Y, as shown by Arrow 288. Returning to FIG. 11, this occurs because after instruction N+1 becomes available, Storage Devices 240 and 250 do not store valid instructions. Selection control signals 242 and 262 therefore allow instruction N+1 to advance to the 2Y and 3Y stages of execution, respectively, during the next two clock cycles. Because the 2Y and 3Y stages of execution for instruction N+1 are completed during the extended-cycle execution of instruction N, all stages of the pipeline are filled at the time instruction N resumes standard execution in stage 2X. Thus, execution for instruction N+1 will complete just one clock cycle after completion of execution for instruction N. This fully-overlapped pipeline execution increases processor throughput.

Figure 13:
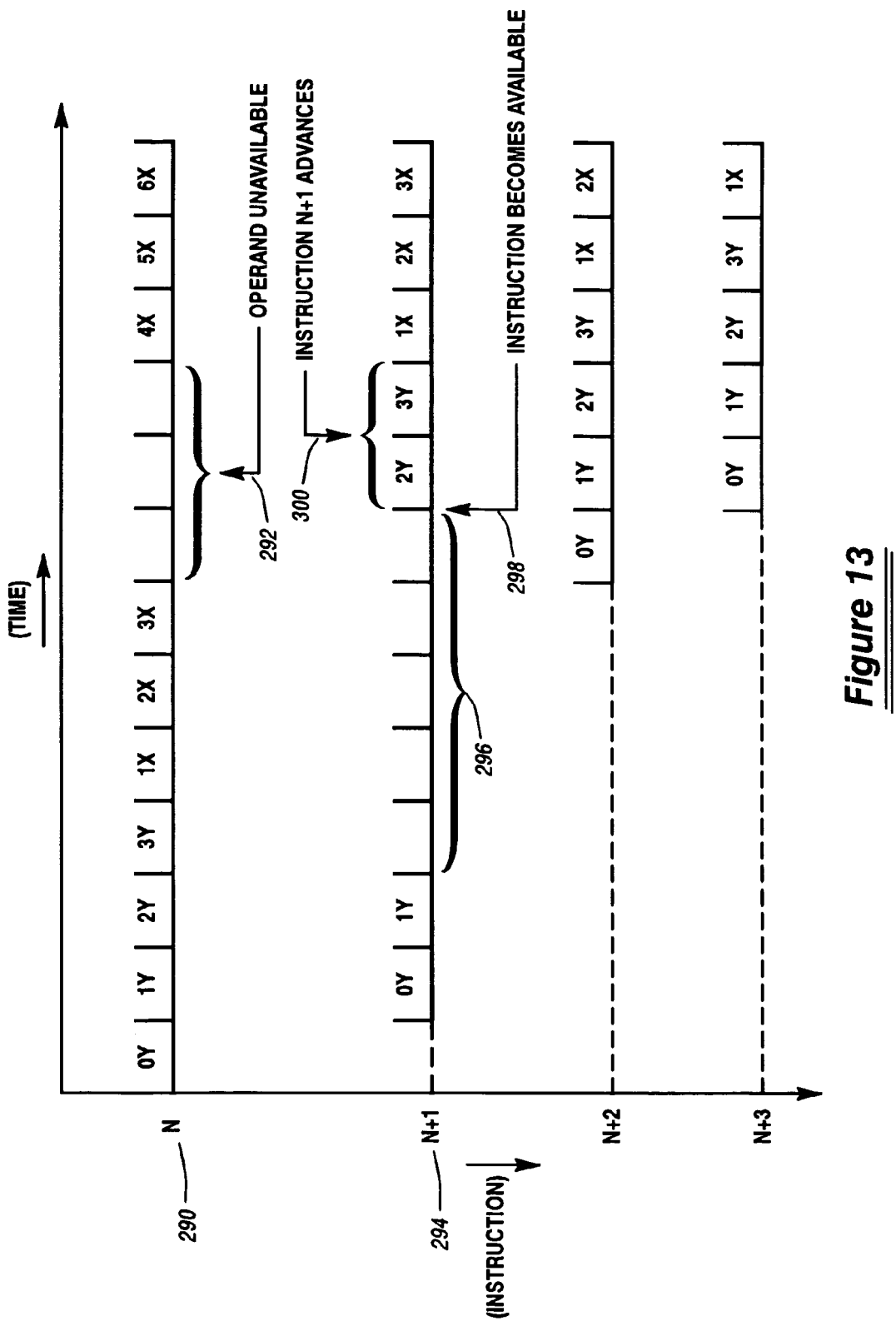
FIG. 13 is a timing diagram illustrating the manner in which the current pipeline design increases processing efficiency when an operand cache miss occurs while an instruction cache miss is occurring for a subsequently-addressed instruction.

FIG. 13 is a timing diagram illustrating the manner in which the current pipeline design increases processing efficiency when a cache miss occurs during an operand fetch for a first instruction while an instruction cache miss is occurring for a subsequently-addressed instruction. During execution of instruction N, an operand cache miss occurs. This is represented by Waveform 290 and Arrow 292. Execution of the next subsequent instruction N+1 is also suspended because of a cache miss to the I-FLC 38, as shown by Waveform 294 and Arrow 296. Instruction N+1 is available from the SLC 42 while execution of instruction N is still suspended, as indicated by Arrow 298. The current pipeline design allows instruction N+1 to advance to stages 2Y and 3Y during the next two clock cycles so that pre-decode and decode operations may be completed while execution of instruction N is still suspended, as shown by Arrow 300. This allows pipeline execution to resume in fully overlapped mode once the operand required by instruction N becomes available.

The foregoing examples illustrate the manner in which the advantages of an asynchronous pipeline design may be incorporated with those of a synchronous clocked pipeline design. The resulting system is less complex and more efficient than prior art designs. In view of the detailed descriptions and drawings, various modifications or implementations will become apparent to those skilled in the art without departing from the spirit and scope of the invention, and what is described to be protected by Letters Patent is set forth in the appended claims.

What is claimed is:

1. For use in an instruction processor that executes instructions included in a predetermined instruction set at an execution rate determined by a system clock signal, a synchronous instruction pipeline, comprising:
  a pipeline execution circuit to process a first predetermined number of instructions simultaneously, each of said first predetermined number of instructions being in a respectively different stage of execution within said pipeline execution circuit, instructions being capable of advancing to a next stage of execution within said pipeline execution circuit at a time determined by the system clock signal; and
  a pipeline fetch circuit coupled to provide each of the first predetermined number of instructions directly from one stage of said pipeline fetch circuit to one stage of said pipeline execution circuit, the pipeline fetch circuit to retain a second predetermined number of instructions simultaneously, each of said second predetermined number of instructions being in a respectively different stage of processing within said pipeline fetch circuit, an instruction being capable of advancing to a next stage of execution within said pipeline fetch circuit at a time determined by the system clock signal and independently of the times at which instructions advance to a next stage of execution within said pipeline execution circuit.

2. The synchronous instruction pipeline of claim 1, wherein said pipeline fetch circuit includes an instruction queue to store a predetermined maximum number of the instructions that are each ready to be processed by said pipeline fetch circuit.

3. The synchronous instruction pipeline of claim 1, wherein said pipeline fetch circuit includes a pre-decode logic circuit to generate pre-decode signals for an instruction that is in a pre-decode stage of processing within said pipeline fetch circuit, and wherein an instruction can enter said pre-decode stage of processing independently of the movement of instructions through said pipeline execution circuit.

4. The synchronous instruction pipeline of claim 3, wherein said pipeline fetch circuit includes a decode logic circuit coupled to said pre-decode logic circuit to generate decode signals for an instruction that is in a decode stage of processing within said pipeline fetch circuit, and wherein an instruction can enter said decode stage of processing from said pre-decode stage of processing independently of the movement of instructions through said pipeline execution circuit.

5. The synchronous instruction pipeline of claim 4, wherein said pipeline fetch circuit includes a first selection circuit coupled to said pre-decode logic circuit to allow an instruction to be received by said pre-decode logic circuit at a time determined by the system clock signal if said decode logic circuit is available to accept an instruction currently being executed by said pre-decode logic circuit.

6. The synchronous instruction pipeline of claim 5, wherein said pipeline fetch circuit includes a second selection circuit coupled to said decode logic circuit to allow an instruction to enter said decode stage of execution at a time determined by the system clock signal if said decode logic circuit is not processing another instruction.

7. The synchronous instruction pipeline of claim 5, wherein said pipeline execution circuit includes a microcode-controlled sequencer to control execution of extended stages of execution of extended-mode ones of the instructions, wherein during said extended stages of execution, ones of the instructions being executed by said pipeline execution circuit are not advancing to a next stage of execution within said pipeline execution circuit, and wherein said first selection circuit includes a control circuit to allow an instruction to enter said pre-decode stage of processing while said extended-mode ones of the instructions are not advancing to a next stage of execution within said pipeline execution circuit.

8. For use in an instruction processor, a synchronous pipeline circuit, comprising:
  an execution circuit to provide a first predetermined number of execution stages, each being capable of performing a respective processing operation on a respective instruction; wherein an instruction is capable of advancing to a next stage of processing within the execution circuit at a time determined by a system clock signal; and
  a fetch circuit coupled to the execution circuit to provide a second predetermined number of fetch stages, each fetch stage being capable of performing a respective pre-execution operation on a respective instruction, wherein an instruction is capable of advancing to a next stage of processing within the fetch circuit at a time determined by the system clock signal, the fetch circuit to transfer each instruction processed by the fetch circuit directly from one of the fetch stages to one of the execution stages;
  wherein ones of the instructions processed within the fetch stages being capable of advancing to different available fetch stages independently of whether instructions are advancing within the execution stages.

9. The pipeline circuit of claim 8, wherein one of the fetch stages includes instruction address generate logic to predict which instructions are to enter the fetch stages.

10. The pipeline circuit of claim 9, wherein the instruction address generate logic includes a circuit to clear ones of the fetch stages in response to a determination that instruction execution was re-directed.

11. The pipeline circuit of claim 8, and further including a memory to store instructions;
  a queue coupled to the memory to temporarily store at least one instruction fetched from the memory; and
  a circuit coupled to the queue and to at least one of the fetch stages to fetch an instruction from the queue for presentation to at least one of the fetch stages.

12. The pipeline circuit of claim 11, wherein the circuit coupled to the queue is capable of retrieving instructions from the queue for presentation to the at least one of the fetch stages regardless of whether instructions are advancing within the execution stages.

13. The pipeline circuit of claim 8, wherein at least one of the execution stages includes a microcode-controlled sequencer to control execution of extended-mode instructions, and wherein during some stages of execution of the extended-mode instructions, instructions are not advancing within the execution circuit.

14. A synchronous pipeline circuit for processing instructions within a data processing system, comprising:
  a first predetermined number of fetch stages to simultaneously process at least a first predetermined number of instructions, wherein an instruction is capable of advancing to a next stage of processing within the fetch stages at a time determined by a system clock signal;

a second predetermined number of execution stages to simultaneously process a second predetermined number of instructions, wherein an instruction is capable of advancing to a next stage of processing within the execution stages at a time determined by the system clock signal, each instruction being received directly from one of the fetch stages by one of the execution stages; and wherein at least one of the fetch stages is capable of providing an instruction to a different one of the fetch stages that is ready to receive an instruction irrespective of movement of instructions between the execution stages.

15. The pipeline circuit of claim 14, wherein one of the fetch stages includes address generate logic to predict which instructions are to enter the fetch stages for processing.

16. The pipeline circuit of claim 15, wherein the address generate logic includes a circuit to flush one or more instructions from the fetch stages if it is determined that a misprediction occurred.

17. The pipeline circuit of claim 14, and further including:
a memory; and
a storage device coupled to one of the fetch stages and to the memory to store instructions retrieved from the memory, wherein a predetermined number of instructions may be stored within the storage device regardless of whether instructions are advancing within the fetch stages.

18. The pipeline circuit of claim 14, wherein one of the execution stages includes a microcode sequencer to execute predetermined ones of the instructions in a manner that may temporarily affect movement of instructions within the execution stages.

19. A synchronous instruction pipeline to execute instructions, comprising:
an execution circuit having a first predetermined number of execution stages to execute a first predetermined number of instructions simultaneously, wherein an instruction is capable of advancing to a next stage of processing within the execution circuit at a time determined by a system clock signal; and
a fetch circuit having a second predetermined number of fetch stages to perform pre-execution operations on at least a second predetermined number of instructions simultaneously, wherein an instruction is capable of advancing to a next stage of processing within the fetch circuit at a time determined by the system clock signal, one of the fetch stages being coupled to provide each instruction processed by the fetch circuit directly to one of the execution stages, and at least one of the at least second predetermined number of instructions being capable of advancing between different ones of the fetch stages regardless of whether an instruction is being transferred by the fetch circuit to the execution circuit.

20. The pipeline of claim 19, wherein the fetch circuit includes an instruction address generate section to determine which instructions are to enter the fetch circuit.

21. The pipeline of claim 20, wherein the instruction address generate section includes a circuit to remove instructions from the fetch circuit during a pipeline flush operation.

22. The pipeline of claim 19, and further including:
a memory to store instructions; and
a queue coupled to store instructions from the memory, the queue further being coupled to provide an instruction to the fetch circuit if one of the fetch stages is available and irrespective of whether an instruction is being provided from the fetch circuit to the execution circuit.

23. The pipeline of claim 22, and further including a circuit coupled to the queue to allow an instruction to be stored to the queue independently of whether an instruction is advancing within the fetch circuit.

24. The pipeline of claim 23, wherein the circuit allows a predetermined maximum number of instructions to be stored to the queue independently of whether an instruction is advancing within the fetch circuit.

25. The pipeline of claim 24, wherein the one of the fetch stages includes a circuit to allow retrieval of an instruction from either the memory or from the queue.

26. The pipeline of claim 19, wherein the fetch circuit includes a circuit that allows instructions to advance within the second predetermined number of fetch stages if one of the execution stages is performing a predetermined function.

27. A method of processing instructions within a synchronous pipeline of an instruction processor, comprising:
a.) performing pre-execution operations on a first predetermined number of instructions simultaneously within a predetermined number of fetch stages in the pipeline, wherein an instruction is capable of advancing to a next stage of processing within the fetch stages at a time determined by a system clock signal;
b.) executing a second predetermined number of instructions simultaneously within a predetermined number of execution stages of the pipeline, wherein an instruction is capable of advancing to a next stage of processing within the execution stages at a time determined by the system clock signal, wherein each of the second predetermined number of instructions were received directly from one of the fetch stages by one of the execution stages; and
c.) processing instructions such that one or more of the first predetermined number of instructions to advance between ones of the fetch stages independently of whether any of the second predetermined number of instructions are advancing between ones of the execution stages.

28. The method of claim 27, and further including:
fetching an instruction from a memory;
storing the instruction within a queue; and
retrieving the instruction from the queue to undergo a pre-execution operation within a predetermined one of the fetch stages.

29. The method of claim 28, wherein at least one of the storing and the retrieving step is performed independently of whether instructions are advancing between ones of the execution stages.

30. The method of claim 29, wherein ones of the steps are repeated for multiple instructions.

31. The method of claim 27, wherein one of the execution stages includes a microcode-controlled sequencer for executing extended-mode instructions, and further including executing one of the extended-mode instructions in a manner that temporarily delays the advancing of instructions between ones of the execution stages.

32. The method of claim 27, and further including:
providing an indication that one or more predetermined operations are occurring within one or more of the execution stages; and
in response to the indication, allowing instructions to advance within the fetch stages.

33. A pipeline circuit for use in an instruction processor, comprising:

instruction fetch means for performing pre-execution operations of a first predetermined number of instructions simultaneously within a predetermined number of fetch stages, wherein an instruction is capable of advancing to a next stage of pre-execution operation at a time determined by a system clock signal;

instruction execution means for executing a second predetermined number of instructions simultaneously within a predetermined number of execution stages, wherein an instruction is capable of advancing to a next stage of execution at a time determined by the system clock signal, each of the second predetermined number of instructions being received directly from one of the fetch stages by one of the execution stages; and wherein the instructions fetch means includes means for allowing at least one of the first predetermined number of instructions to advance within the fetch stages irrespective of whether instructions are advancing within the execution stage.

* * * * *